(12) United States Patent
Meyer

(10) Patent No.: US 8,042,422 B2
(45) Date of Patent: Oct. 25, 2011

(54) SEALING ELEMENT, AND DRIVE UNIT CONTAINING A SEALING ELEMENT

(75) Inventor: Christian Meyer, Karlsruhe-Wolfartsweier (DE)

(73) Assignee: Robert Bosch GmbH, Stuttgart (DE)

( * ) Notice: Subject to any disclaimer, the term of this patent is extended or adjusted under 35 U.S.C. 154(b) by 1143 days.

(21) Appl. No.: 11/341,418

(22) Filed: Jan. 30, 2006

(65) Prior Publication Data

US 2006/0170165 A1 Aug. 3, 2006

(30) Foreign Application Priority Data

Jan. 31, 2005 (DE) .................. 10 2005 004 323

(51) Int. Cl.
*H02K 7/116* (2006.01)
*F16J 15/32* (2006.01)
(52) U.S. Cl. .............. 74/421 A; 277/556; 277/574
(58) Field of Classification Search .......... 277/551, 277/553, 556, 572–574; 74/421 A; 384/481, 384/484, 607

See application file for complete search history.

(56) References Cited

U.S. PATENT DOCUMENTS

| 2,873,153 | A | * | 2/1959 | Haynie | 384/484 |
|---|---|---|---|---|---|
| 3,301,081 | A | * | 1/1967 | Kern, Jr. | 74/421 A |
| 3,306,683 | A | * | 2/1967 | Deuring | 384/486 |
| 3,563,104 | A | * | 2/1971 | Schuster | 74/395 |
| 3,924,861 | A | * | 12/1975 | Szepesvary | 277/551 |
| 4,015,883 | A | * | 4/1977 | Taylor | 384/484 |
| 4,108,447 | A | * | 8/1978 | Scholin | 277/553 |
| 5,370,404 | A | * | 12/1994 | Klein et al. | 277/572 |
| 6,173,964 | B1 | * | 1/2001 | Bell et al. | 277/584 |
| 6,315,439 | B1 | * | 11/2001 | Denley | 362/524 |
| 6,397,691 | B1 | * | 6/2002 | Greene | 74/89.2 |
| 6,481,306 | B2 | * | 11/2002 | Adachi et al. | 74/425 |
| 2007/0137353 | A1 | * | 6/2007 | Chu | 74/425 |

* cited by examiner

*Primary Examiner* — James Pilkington
(74) *Attorney, Agent, or Firm* — Ronald E. Greigg

(57) ABSTRACT

A sealing element for sealing off a drive unit, having a radial shaft sealing ring that has a radial sealing face for sealing off from a first component and a diametrically opposed radial sealing lip for sealing off from a further rotatable component, in which an axial sealing ring for axial sealing of a third component is integrally formed onto the radial shaft sealing ring.

30 Claims, 2 Drawing Sheets

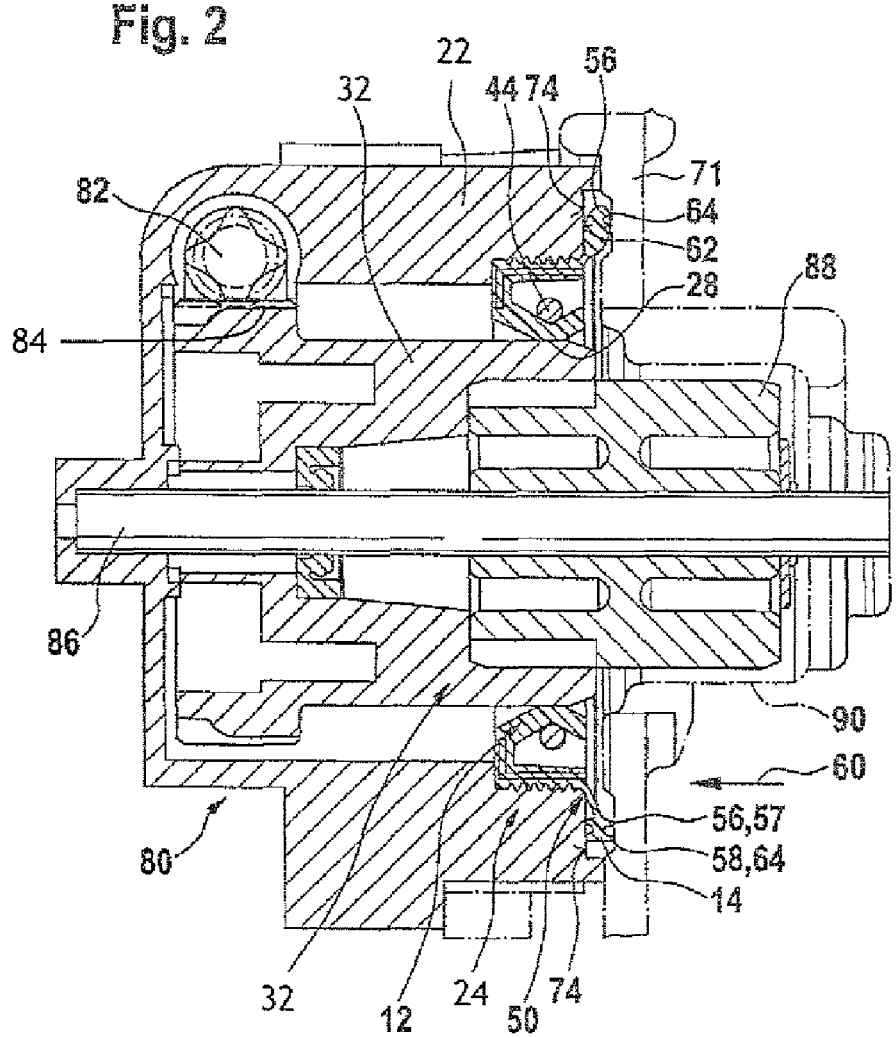

SEALING ELEMENT, AND DRIVE UNIT CONTAINING A SEALING ELEMENT

CROSS REFERENCE TO RELATED APPLICATIONS

This application is based on German Patent Application 10 2005 004 323.2 filed Jan. 31, 2005, upon which priority is claimed.

BACKGROUND OF THE INVENTION

1. Field of the Invention

The invention relates to a sealing element, and to a drive unit containing a sealing element, having a radial shaft sealing ring.

2. Description of the Prior Art

U.S. Pat. No. 4,015,883 discloses a sealing element which is located between an outer and an inner ring of a ball bearing, in order to seal off the roller bodies of the bearing from the environment. The sealing element is embodied as a radial shaft sealing ring, which is braced by an outer radial sealing face on the outer bearing ring, and rests with a diametrically opposed inner radial sealing lip on the inner bearing part, such as a rotatable shaft. For reinforcement, the sealing element has a support ring, which is disposed inside the sealing material. The sealing element also has a spring ring, which presses the inner sealing lip radially against the inner bearing ring. A sealing element of this kind is suitable for radial sealing of two cylindrical jacket faces rotatable counter to one another. However, with such a sealing element, axial sealing between two axially adjacent components cannot be achieved.

OBJECT AND SUMMARY OF THE INVENTION

The sealing element of the invention, and a drive unit having such a sealing element, have the advantage that because of the integral forming of an axial sealing ring onto the radial shaft sealing ring, a radial dynamic sealing along with an axial static sealing can be simultaneously attained by a single sealing element. As a result, the use of a plurality of separate sealing rings is dispensed with, as are the assembly steps for disposing the various sealing elements. Therefore, because of the reduction in the number of components, both the tool costs for producing them and the costs of assembling and installing them are saved.

Advantageous refinements of the devices are possible. Especially simply, the axially sealing ring element can be integrally formed onto the radial shaft sealing ring with an encompassing flexible connecting strip, which holds the axial sealing ring to the radial shaft sealing ring while still allowing a considerable amount of movement of these two sealing rings before they are assembled into position within the components of the drive unit which they are to seal. Further, as a result of the flexible connecting strip, as the radial sealing ring is assembled to the drive unit it is to seal, the axial sealing ring is fixed, reliably and exactly centered, relative to the radial shaft sealing ring, and also relative to the components it is to seal. This aids greatly in accurately and quickly assembling all of the parts. A connecting strip of this kind is also especially simple, from a process standpoint, to make as part of a one-piece sealing body.

If the axial sealing ring has a larger diameter than the outer diameter of the radial shaft sealing ring, then with this sealing element, in addition to the dynamic radial sealing of an inner rotatable body relative to an outer component, this component can also be reliably sealed off axially from a further axially adjacent component. The radial sealing action of the radial shaft sealing ring is affected only insignificantly, if at all, by the axial contact force of the further component.

Depending on the specific embodiment and use of the two axially adjacent components, the axial sealing ring has a circular, oval, or X-shaped or Y-shaped or double-Y-shaped profile, which is joined in each case to the radial shaft sealing ring via the flexible connecting strip. The axial sealing ring is thus embodied as a simple O-ring, whose cross section is modified to suit the component geometry.

In a further version, one or more sealing barriers are integrally formed onto the axial sealing ring and seal off the two axially disposed flange components from the environment.

It is advantageous to dispose a support body entirely within the interior of the radial shaft sealing ring, which support body is preferably embodied as a cup-shaped reinforcement ring. This reinforcement ring improves the dimensional stability of the radial shaft sealing ring, and hence provides better contact of the radial shaft sealing ring with the faces to be sealed off, and thus improves sealing.

The sealing element may be made especially favorably as an injection-molded part, in which the axially sealing ring is embodied integrally with the sealing body which forms the outer radial sealing face of the radial shaft sealing ring. It is especially advantageous if the reinforcement ring is spray-coated as an inlay part, and thus positioned entirely within the radial sealing ring, with a single elastic sheathing which simultaneously forms the radial shaft sealing ring and the axial sealing ring.

So that the inner sealing lip can be pressed reliably against the rotary body, a spring ring which contracts is disposed inside the radial shaft sealing ring, thus creating a spring-reinforced sealing lip. This spring can be placed inside the sealing body before the sealing element is installed, so that the sealing element of the invention can be installed as a single component.

To attain a reliable sealing action, the reinforcement ring is made of metal, preferably sheet steel, and the sealing body is preferably made of an HNBR or EPDM rubber or silicone.

The drive unit of the invention has the advantage that because of the use of a single piece sealing element, which is the combination of the radial shaft sealing ring, the axial sealing ring, and the flexible connecting strip which connects them, the number of components and hence the expense of assembly and installation are reduced.

In a gearbox, not only is a rotatable driven wheel reliably sealed off but an axial seal for binding to a customer-specific gear interface reliably is also created.

Because of the one-piece embodiment of the axial sealing ring, or O-ring, with the radial shaft sealing ring, the axial sealing ring is reliably positioned and fixed upon the installation of the radial shaft sealing ring in the housing of the drive unit by means of the flexible connecting strip. Thus this drive unit, with this kind of open gear interface, can already be shipped to the customer with completely installed seals, and the customer can, without providing further axial sealing rings, connect this drive unit directly to the customer-specific gear interface. This kind of captive, positionally precise disposition of the axial sealing ring on the mounting face of the drive unit represents an enormous advantage for mounting the customer-specific gear interface.

BRIEF DESCRIPTION OF THE DRAWINGS

The invention will be better understood and further objects and advantages thereof will become more apparent from the ensuing detailed description of preferred embodiments, taken in conjunction with the drawings, in which:

FIG. 2 is a section through a drive unit of the invention with the sealing element installed.

DESCRIPTION OF THE PREFERRED EMBODIMENTS

Figure 1:
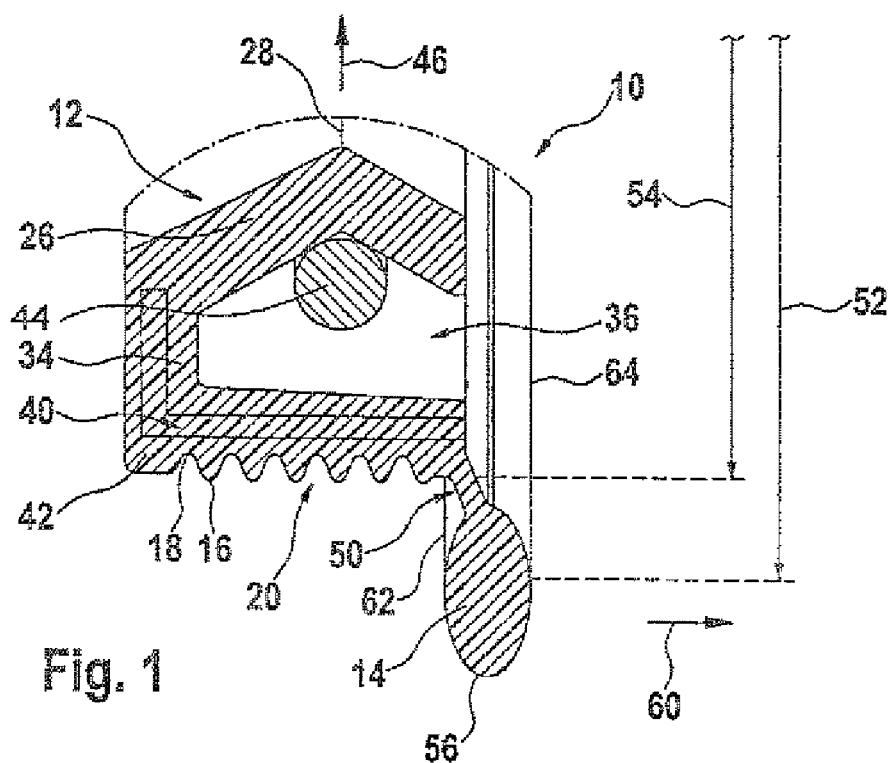
FIG. 1 shows a cross section through a portion of a sealing element of the invention.

In FIG. 1, a sealing element 10 is shown, which has a radial shaft sealing ring 12 that is joined to an axial sealing ring 14 via the flexible connecting strip. The radial shaft sealing ring 12 has a radial sealing face 16, which in the exemplary embodiment has a structuring 20 embodied as grooves 18. This structuring 20 serves to compensate for pressure peaks and for better adhesion to an outer component 22 to be radially sealed off. Diametrically opposite the outer sealing face 16, a sealing lip 26 is integrally formed onto the radial shaft sealing ring 12 and has a sealing edge 28 for radial contact with an inner component 30. The inner sealing lip 26 is joined to the outer sealing face 16 via a connecting region 34 extending in the radial direction, so that the radial shaft sealing ring 12 has a substantially U-shaped profile 36. The sealing element 10 in the exemplary embodiment is produced by means of an injection-molding process, in which a metal support, or reinforcement ring 40, as an inlay part, is spray-coated with a sheathing 42 of elastic material, so that it is entirely within the radial shaft sealing ring 12. The support, or reinforcement ring 40 is embodied for instance as a cup-shaped steel ring, which assures that the outer sealing face 16 and the sealing lip 26 remain positioned exactly with respect to one another. To increase the contact pressure of the sealing edge 28 against the inner component 30, the sealing element 10 has an annular spring element 44, which is embodied for instance as a spiral spring, which surrounds the sealing lip 26 and generates a radially inward-oriented contact pressure 46 on the sealing lip 26.

The axial sealing ring 14 is integrally formed onto the radial shaft sealing ring 12 via a flexible encompassing connecting strip 50. In the exemplary embodiment, the axial sealing ring 14 is embodied as formed integrally with the sheathing 42 of the radial shaft sealing ring 12 by means of the flexible connecting strip. As a result, the U-shaped radial shaft sealing ring 12 can be made together with the axial sealing ring 14 as an injection-molded part in a single process in a single injection-molding tool. The annular spring element 44 is then placed afterward in the U-shaped profile 36 of the radial shaft sealing ring 12. As the sheathing 42 for the radial shaft sealing ring 12 and for the axial sealing ring 14, an NBR or EPDM soft rubber, or some other elastomer, is preferably used. The encompassing flexible connecting strip 50 has at least one radial component, so that the axial sealing ring 14 is located with a middle diameter 52, which is radially outside the outer diameter 54 of the outer sealing face 16. The axial sealing ring 14 has a cross section 56, which in the exemplary embodiment of FIG. 1 is oval but in variations may also be circular, X-shaped, Y-shaped, or rectangular.

In a further exemplary embodiment, as shown in the bottom half of FIG. 2, the basic body of the axial sealing ring 14 has a rectangular cross section 57, onto which one or more sealing barriers 58 are formed integrally. The sealing barriers 58 extend in the axial direction 60 and, because of the small contact area, they increase the contact pressure of the axial seal. The axial sealing ring 14 has a first and a second axial sealing face 62, 64, which serve to provide contact with the outer component 22 on the one hand and with a further axially disposed component 71 on the other.

The sealing element 10 in FIG. 2, with differently drawn cross sections 56, 57 of the axial sealing ring 14, is built into a drive unit 80 of the invention. The outer component 22 is embodied as a housing 24 that is fixed against relative rotation. The inner component 30 is a body of rotation 32, which is supported on a fixed shaft 86. The body of rotation 32 is embodied as a worm wheel 84, which is driven by a worm 82 that is connected to an electric motor, not otherwise shown. A further axial component is embodied as a customer-specific gear component 71, which can be joined to the drive unit 80 via a mounting face 74 of the housing 24, and the drive moment is transmitted from the worm wheel 84 to the customer-specific gear component 71 via a driven pinion 88. The sealing element 10, with the radial shaft sealing ring 12, seals off the housing 24 dynamically from the body of rotation 32, so that the drive unit 80 is sealed off from the outside with respect to oil and dirt even without a customer-specific gear component 71. Since the axial sealing ring 14 is joined to the radial shaft sealing ring 12 via the flexible connecting strip 50, once the radial shaft sealing ring 12 has been installed, the axial sealing ring 14 is centered and fixed on the mounting face 74 of the component 22 by the flexible connecting strip 50. As a result, the customer-specific gear component 71 can be flanged axially to the drive unit 80 without installing further seals, and the axial sealing ring 14, in its first and second axial sealing faces 62 and 64, rests on the one hand on the outer component 22 and on the other on the further axial component 71. The axial sealing ring 14 with the radial shaft sealing ring 12 forms a single sealing element 10, and optionally the annular spring element 44 is inserted into the radial shaft sealing ring 12. When the customer-specific gear component 71 is installed in the drive unit 80, the pinion 88 comes to mesh with a corresponding hollow gear wheel 90 of the gear component 71. As a result of the radial force of installation, the axial sealing ring 14 is deformed between the components 22 and 70, so that the pinion 88 is sealed off from the environment.

Figure 3:
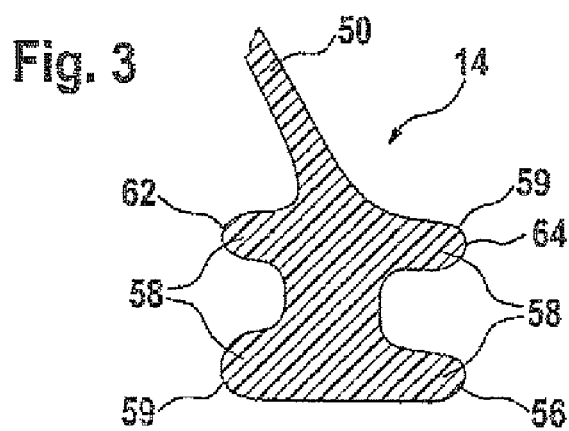
FIG. 3 is an enlarged fragmentary sectional view showing a further exemplary embodiment of a sealing element.

In FIG. 3, a further variation of a cross section 56 of the axial sealing ring 14 is shown. Two sealing barriers 58 are integrally formed onto the two axial sides and serve as a first and second sealing face 62, 64, respectively. The sealing barriers 58 have a curvature 59, which upon installation between the components 22 and 70 is pressed against a mounting face 74 and the customer-specific component 71. In this version, the axial sealing ring 14 is likewise embodied as a common part along with the sheathing 42 of the radial sealing ring 12 by means of the flexible connecting strip 50.

It should be noted that in terms of the exemplary embodiments shown in the drawings, manifold combinations of the various characteristics with one another are possible. For instance, the specific design of the radial shaft sealing ring 12 and of the axial sealing ring 14 can be adapted to the intended use. One skilled in the art is familiar with various versions of radial sealing rings 12: with or without an annular spring 44, with or without a support ring 40, and acting unilaterally or on both sides in terms of its pressure load. The specific embodiment of the sealing lip 26 with the sealing edge 28, and the outer sealing face 16 with the structuring 20, can also be embodied arbitrarily. What is decisive for the invention is that the axial sealing ring 14 is joined to the radial shaft sealing ring 12 by the flexible connection strip 50, so that simultaneously with the dynamic radial shaft seal being positioned, the axial sealing for a further component 71 is furnished. The specific embodiment and production of the flexible connecting strip 50 can also vary; for instance, the connecting strip 50 need not be embodied as extending all the way around. The length, thickness and orientation of the flexible connecting strip 50 likewise depends on the precise sealing geometry of the components 22, 30, 71 to be sealed off and can be adapted accordingly. The axial sealing ring 14 is embodied as an O-ring extending all the way around, and its cross section 56, 57 or sealing contour with its sealing faces 62, 64 and sealing barriers 58 can also be varied arbitrarily. Preferably, the sealing element 10 of the invention is used in the electric motor gear and drive unit 80, which has a gear interface with a customer-specific gear component 71. For instance, a drive unit 80 of this kind is used in a motor vehicle for adjusting moving parts, and particularly for an automatic transmission or a differential gear.

The foregoing relates to preferred exemplary embodiments of the invention, it being understood that other variants and embodiments thereof are possible within the spirit and scope of the invention, the latter being defined by the appended claims.

I claim:

1. A drive unit for an electrical geared motor, comprising:
    a housing,
    a driven wheel located in the housing and having a mounting face for a gear component which is drivable by means of the driven wheel,
    a sealing element disposed in the drive unit for sealing off the drive unit, the sealing element comprising a radial shaft sealing ring having a radial sealing face for sealing off from an outer component and a diametrically opposed radial sealing lip for sealing off from an inner, rotatable component, the sealing element also having an axial sealing ring for axial sealing of an axial component, the axial sealing ring being integrally formed onto the radial shaft sealing ring,
    wherein the axial sealing ring is joined to the radial shaft sealing ring by means of an encompassing connecting strip,
    wherein the connecting strip has an extent in the axial direction which is less than the extent of the axial sealing ring, and the connecting strip is thinner than the axial sealing ring or the radial shaft sealing ring, and
    wherein the connecting strip is made entirely of an elastic material so as to be flexible so that before the scaling element is disposed in the drive unit, the radial shaft sealing ring and the axial sealing ring are flexibly connected so that, while being formed integrally and thus being connected, they have freedom of movement with respect to each other.

2. The drive unit as recited in claim 1, wherein the radial sealing face is disposed on the outer circumference of the radial shaft scaling ring, and wherein the axial sealing ring is disposed radially outside the radial sealing face.

3. The drive unit as recited in claim 2, wherein the axial sealing ring has a cross section, which is embodied as circular or oval or rectangular or X-shaped or Y-shaped or double-Y-shaped.

4. The drive unit as recited in claim 1, wherein the radial shaft sealing ring comprises
    a reinforcement ring which is encased entirely within the radial shaft sealing ring by an elastic sheathing, and which reinforcement ring is cup-shaped.

5. The drive unit as recited in claim 2, further comprising an annular spring element disposed between the inner sealing lip and the radial sealing face, by means of which spring element the inner sealing lip is pressed against the rotatable component.

6. The drive unit as recited in claim 1, wherein the axial sealing ring comprises at least one encompassing sealing barrier.

7. The drive unit as recited in claim 2, wherein the radial shaft sealing ring comprises
    a reinforcement ring which is encased entirely within the radial shaft sealing ring by an elastic sheathing, and which reinforcement ring is cup-shaped.

8. The drive unit as recited in claim 7, wherein the sheathing and the axial sealing ring are embodied as a common injection-molded part.

9. The drive unit as recited in claim 7, wherein the elastic sheathing is made of EPDM, and the reinforcement ring is made of metal.

10. The drive unit as recited in claim 1, further comprising an annular spring element disposed between the inner sealing lip and the radial sealing face, by means of which spring element the inner sealing lip is pressed against the rotatable component.

11. The drive unit as recited in claim 1. in that the sealing element on the one hand seals off the housing radially from the rotatable driven wheel and simultaneously makes the axial sealing ring available for the mounting of the gear component which is drivable by means of the driven wheel.

12. The drive unit as recited in claim 11, wherein the sealing element is pressed into place between the housing and the driven wheel in such a way that the axial sealing ring is positioned, or centered, on the mounting face exactly opposite a mounting position of the gear component which is drivable by means of the driven wheel.

13. The drive unit as recited in claim 1, wherein the sealing element is pressed into place between the housing and the driven wheel in such a way that the axial sealing ring is positioned, or centered, on the mounting face exactly opposite a mounting position of the gear component which is drivable by means of the driven wheel.

14. A drive unit, for an electrical geared motor, comprising:
    a housing,
    a drivable driven wheel located in the housing and having a mounting face for a gear component which is drivable by means of the driven wheel,
    a sealing element disposed in the drive unit for sealing off the drive unit, the sealing element comprising a radial shaft sealing ring having a radial sealing face for sealing off from an outer component and a diametrically opposed radial sealing lip for sealing off from an inner rotatable component, the sealing element also having an axial sealing ring for axial sealing of an axial component, the axial sealing ring being integrally formed with the radial shaft sealing ring,
    wherein the axial sealing ring has a cross section, which is embodied as circular or oval or rectangular or X-shaped or Y-shaped or double-Y-shaped, and
    wherein the axial sealing ring is connected to the radial shaft sealing ring via a flexible connecting strip which is thinner than either of the axial sealing ring or the radial shaft sealing ring, the flexible connecting strip being made entirely of an elastic material so as to be flexible so that before the sealing element is disposed in the drive unit, the radial shaft sealing ring and the axial sealing ring, while being formed integrally, are flexibly connected by the flexible connecting strip so that they have freedom of movement with respect to each other.

15. The drive unit as recited in claim 14, wherein the radial scaling face is disposed on the outer circumference of the radial shaft sealing ring, and wherein the axial sealing ring is disposed radially outside the radial sealing face.

16. The drive unit as recited in claim 15, further comprising an annular spring element disposed between the inner sealing lip and the radial sealing face, by means of which spring element the inner sealing lip is pressed against the rotatable component.

17. The drive unit as recited in claim 14, wherein the axial sealing ring comprises at least one encompassing sealing barrier.

18. The drive unit as recited in claim 14, wherein the radial shaft sealing ring comprises
a reinforcement ring which is encased entirely within the radial shaft sealing ring by an elastic sheathing, and which reinforcement ring is cup-shaped.

19. A drive unit for an electrical geared motor, comprising:
a housing,
a driven wheel located in the housing, the driven wheel having a mounting face for a gear component which is drivable by means of the driven wheel,
a sealing element disposed in the drive unit for sealing off the drive unit, the sealing element comprising a radial shaft sealing ring having a radial sealing face for sealing off from an outer component and a diametrically opposed radial sealing lip for sealing off from an inner, rotatable component, the sealing element also having an axial sealing ring for axial sealing of an axial component, the axial sealing ring being integrally formed onto the radial shaft sealing ring,
wherein the housing is fixed against relative rotation,
wherein the axial sealing ring includes a flexible connecting strip (50) which connects it to the radial shaft sealing ring,
wherein the flexible connecting strip is made entirely of an elastic material,
wherein the driven wheel is embodied as a worm wheel (84) that is driven by a worm, and driving torque is transmitted from the worm wheel (84) to the gear component via a drive pinion (88), and
wherein the formation of the axial sealing ring onto the radial shaft sealing ring provides a flexible connection so that before the sealing element is disposed in the drive unit, the radial shaft sealing ring and the axial sealing ring, while being integrally formed, are flexibly connected so as to have freedom of movement with respect to each other before they are positioned in the drive unit.

20. The drive unit as recited in claim 19, wherein the gear component is mounted onto the drive unit (80), by means of the pinion (88) entering into engagement with a corresponding hollow gear wheel (90) of the gear component.

21. The drive unit as recited in claim 19, wherein the axial sealing ring is embodied as an O-ring which is formed as one piece with the radial shaft sealing ring so that when the radial shaft sealing ring is positioned in the drive unit, the axial sealing ring is disposed in captive and precisely positioned fashion on a mounting face of the drive unit.

22. The drive unit as recited in claim 19, wherein the drive unit is embodied as part of an automatic transmission or a differential gear.

23. The drive unit as recited in claim 19, wherein the axial scaling ring comprises at least one encompassing sealing barrier.

24. The drive unit as recited in claim 19, wherein the axial sealing ring includes two sealing barriers (58), each of which are integrally formed onto both axial sides of the axial sealing ring (14).

25. The drive unit as recited in claim 24, wherein the sealing barriers (58) each have a curved surfaces (59) which are pressed against an attachment face (74) of the housing and also against a surface of the gear component.

26. The drive unit as recited in claim 19, wherein the axial sealing ring has a cross section which is embodied as X-shaped, or Y-shaped, or double-Y-shaped.

27. The drive unit as recited in claim 19, wherein the radial shaft sealing ring comprises a reinforcement ring which is encased within the radial shaft sealing ring by an elastic sheathing, and which reinforcement ring is cup-shaped.

28. The drive unit as recited in claim 27, wherein the sheathing and the axial sealing ring are embodied as a common injection-molded part, and further comprising
an annular spring element disposed between the inner sealing lip and the radial sealing face, by means of which spring element the inner sealing lip is pressed against the rotatable component.

29. The drive unit as recited in claim 27, wherein the elastic sheathing is made of EPDM, and the reinforcement ring is made of metal.

30. The drive unit as recited in claim 19, wherein the flexible connecting strip (50) is integrally formed onto the radial shaft sealing ring, and the flexible connecting strip is embodied as a component of a one-piece sealing body.

* * * * *

UNITED STATES PATENT AND TRADEMARK OFFICE
CERTIFICATE OF CORRECTION

| | | |
|---|---|---|
| PATENT NO. | : 8,042,422 B2 | Page 1 of 1 |
| APPLICATION NO. | : 11/341418 | |
| DATED | : October 25, 2011 | |
| INVENTOR(S) | : Christian Meyer | |

It is certified that error appears in the above-identified patent and that said Letters Patent is hereby corrected as shown below:

Column 5, Line 44: Correct "scaling" to "sealing".

Column 5, Line 52: Correct "scaling" to "sealing".

Column 6, Line 65: Correct "scaling" to "sealing".

Column 8, Line 13: Correct "scaling" to "sealing".

Signed and Sealed this
Twenty-seventh Day of December, 2011

David J. Kappos
*Director of the United States Patent and Trademark Office*